US012785990B2

(12) United States Patent
Chen et al.

(10) Patent No.: US 12,785,990 B2
(45) Date of Patent: Nov. 3, 2026

(54) PHYSICALLY UNCLONABLE FUNCTION DEVICE AND METHOD FOR FABRICATING THE SAME

(71) Applicant: UNITED MICROELECTRONICS CORP., Hsin-Chu City (TW)

(72) Inventors: Chang-Yih Chen, Tainan City (TW); Kuo-Hsing Lee, Hsinchu County (TW); Chun-Hsien Lin, Tainan City (TW)

(73) Assignee: UNITED MICROELECTRONICS CORP., Hsin-Chu City (TW)

( * ) Notice: Subject to any disclaimer, the term of this patent is extended or adjusted under 35 U.S.C. 154(b) by 433 days.

(21) Appl. No.: 18/518,567

(22) Filed: Nov. 23, 2023

(65) Prior Publication Data

US 2025/0141701 A1 May 1, 2025

(30) Foreign Application Priority Data

Oct. 26, 2023 (TW) ................................ 112140939

(51) Int. Cl.

| | |
|---|---|
| ***H04L 9/32*** | (2006.01) |
| ***H10D 1/66*** | (2025.01) |
| ***H10D 84/80*** | (2025.01) |

(52) U.S. Cl.

CPC ............ *H04L 9/3278* (2013.01); *H10D 1/66* (2025.01); *H10D 84/811* (2025.01)

(58) Field of Classification Search

CPC ....... H04L 9/3278; H10D 84/811; H10D 1/66

USPC ........................................................ 438/14

See application file for complete search history.

(56) References Cited

U.S. PATENT DOCUMENTS

| | | | | |
|---|---|---|---|---|
| 9,787,480 | B2 | 10/2017 | Guo et al. | |
| 10,985,922 | B2 | 4/2021 | Zhou et al. | |
| 11,469,335 | B2 | 10/2022 | Yang et al. | |
| 2012/0319238 | A1* | 12/2012 | Chuang .................... | H10D 1/66 257/532 |
| 2015/0115402 | A1* | 4/2015 | Yen ..................... | H10W 20/497 438/396 |
| 2022/0310537 | A1* | 9/2022 | Lin ....................... | G11C 17/16 |

* cited by examiner

*Primary Examiner* — Phuc T Dang

(74) *Attorney, Agent, or Firm* — Winston Hsu

(57) ABSTRACT

A method for fabricating a physically unclonable function (PUF) device includes the steps of first providing a PUF cell array having a plurality of unit cells, in which each of the unit cells includes a transistor and a first metal-oxide semiconductor capacitor (MOSCAP) and a second MOSCAP coupled to the transistor. Next, a voltage is transmitted through the transistor to the first MOSCAP and the second MOSCAP and whether the first MOSCAP or the second MOSCAP reaches a breakdown is determined.

14 Claims, 8 Drawing Sheets

PHYSICALLY UNCLONABLE FUNCTION DEVICE AND METHOD FOR FABRICATING THE SAME

BACKGROUND OF THE INVENTION

1. Field of the Invention

The invention relates to a physical unclonable function (PUF) device and fabrication method thereof.

2. Description of the Prior Art

Even though integrated circuits are usually fabricated by similar processes with same materials, each of the integrated circuits could still have a unique feature or variation specific to itself. In recent years, researchers have come up with physical unclonable function (PUF) devices that utilize specific variations in integrated circuits as a unique feature similar to human DNA. Due to its nature of randomness, the output of PUF devices are very difficult to predict thereby increasing its level of security.

SUMMARY OF THE INVENTION

According to an embodiment of the present invention, a method for fabricating a physically unclonable function (PUF) device includes the steps of first providing a PUF cell array having a plurality of unit cells, in which each of the unit cells includes a transistor and a first metal-oxide semiconductor capacitor (MOSCAP) and a second MOSCAP coupled to the transistor. Next, a voltage is transmitted through the transistor to the first MOSCAP and the second MOSCAP and whether the first MOSCAP or the second MOSCAP reaches a breakdown is determined.

According to another aspect of the present invention, a physically unclonable function (PUF) device includes a PUF cell array having a plurality of unit cells, in which each of the unit cells includes a transistor and a first metal-oxide semiconductor capacitor (MOSCAP) and a second MOSCAP coupled to the transistor. Preferably, a voltage is transmitted through the transistor to the first MOSCAP and the second MOSCAP to determine whether the first MOSCAP or the second MOSCAP reaches a breakdown.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
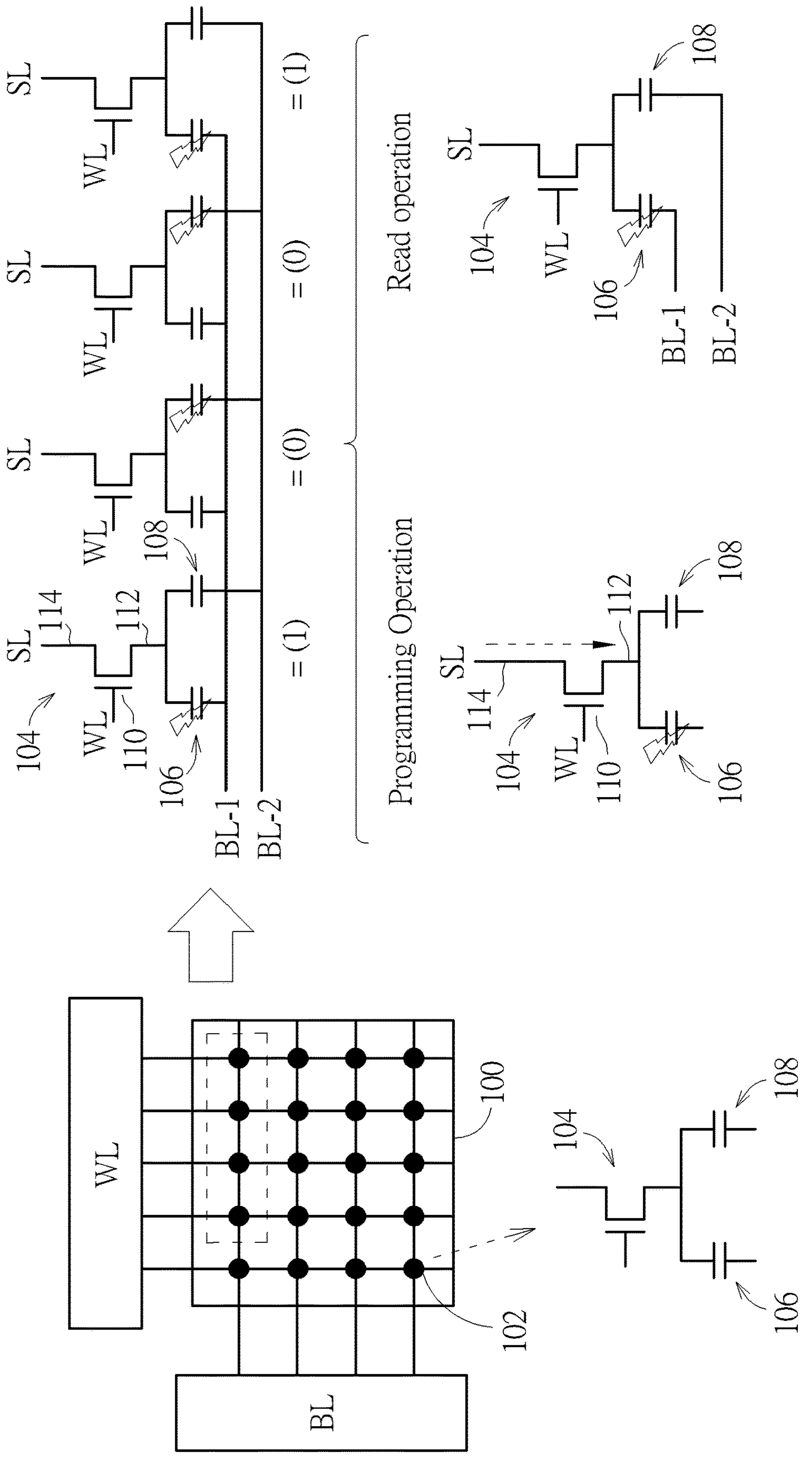
FIG. 1 illustrates a perspective view for fabricating a PUF device under a circuit architecture according to an embodiment of the present invention.

Referring to FIG. 1, FIG. 1 illustrates a perspective view for fabricating a PUF device under a circuit architecture according to an embodiment of the present invention. As shown on the top left corner of FIG. 1, a PUF cell array 100 is first provided, in which the PUF cell array 100 includes a plurality of unit cells 102 and each of the unit cells 102 is connected to bit lines (BL) and word lines (WL) according to a circuit design.

As shown on the bottom left corner of FIG. 1, each of the unit cells 102 further includes a transistor 104 such as a metal-oxide semiconductor (MOS) transistor and a first MOSCAP 106 and a second MOSCAP 108 coupled or electrically connected to the transistor 104 at the same time. As shown on the top right corner of FIG. 1, each of the transistors 104 includes a gate 110 or gate electrode, a first end or first terminal 112, and a second end or second terminal 114, in which the gate 110 is coupled to a word line WL, the first terminal 112 is coupled to the first MOSCAP 106 and the second MOSCAP 108 at the same time, and the second terminal 114 is coupled to a source line SL. Preferably, the first MOSCAP 106 coupled to the first terminal 112 or each transistor 104 is coupled to a first bit line BL-1 while the second MOSCAP 108 is coupled to a second bit line BL-2.

Referring to the bottom right corner of FIG. 1, which illustrates an operational view for conducting a programming operation and a read operation on the PUF cell array according to an embodiment of the present invention. As shown on the left side of the bottom right corner of FIG. 1, a programming operation alone could be first conducted to transmit a voltage from the transistor 104 to the first MOSCAP 106 and the second MOSCAP 108 and then determine whether the first MOSCAP 106 or the second MOSCAP 108 reaches a breakdown.

Specifically, the programming operation conducted at this stage mainly transmits a voltage from the source line SL connected to the second terminal 114 of the transistor 104 through a compliance limiter to the first MOSCAP 106 and the second MOSCAP 108 until either one of the MOSCAP 106 or 108 reaches a breakdown. Preferably, the compliance limiter limits the programming operation to be a single action operation, such that as either one of the first MOSCAP 106 or the second MOSCAP 108 reaches a breakdown the entire action is stopped. Moreover, the breakdown state reached in this embodiment is preferably a soft breakdown, which principally conducts an oxide rupture process by damaging gate dielectric layers made of silicon oxide in the MOSCAP devices as voltages are used to stress the first MOSCAP 106 and second MOSCAP 108.

It should be noted that the action of using electrical voltage to stress the first MOSCAP and the second MOSCAP so that either one of the MOSCAP reaches a breakdown is completely random. In other words, when voltages are transmitted from the source line SL of the second terminal 114 of the transistor 104 to the first MOSCAP 106 and second MOSCAP 108 connected to the second terminal 112, only one of the MOSCAP would reach a breakdown state as users are unable to predict which one of the MOSCAPs would reach the breakdown first. Hence, the first MOSCAP 106 could reach a breakdown first or the second MOSCAP 108 could reach a breakdown first.

Next, as shown on the right side of the bottom right corner of FIG. 1, during a read operation the first bit line BL-1 and the second bit line BL-2 could be used to detect which one of the MOSCAP is under a conductive state or which one of the MOSCAP is under a breakdown state. For instance, if the first bit line BL-1 were to detect a breakdown state a first state value such as state 1 could be assigned to the first MOSCAP 106 whereas if the second bit line BL-2 were to detect a breakdown state a second state value such as state 0 could be assigned to the second MOSCAP 108.

Overall, the entire programming operation could be carried out by first transmitting voltage from the transistor 104 to the first MOSCAP 106 and the second MOSCAP 108 and then determine which one of the first MOSCAP 106 or the second MOSCAP 108 reaches a breakdown. When the voltage is transmitted to the first MOSCAP 106 to initiate a breakdown, the first MOSCAP 106 could be assigned a first state value such as "1" while the second MOSCP 108 could be assigned a second state value such as "0". Similarly, when the voltage is transmitted to the second MOSCAP 108 to initiate a breakdown, the second MOSCAP 108 could be assigned a first state value such as "1" while the first MOSCAP 106 could be assigned a second state value such as "0".

Figure 2:
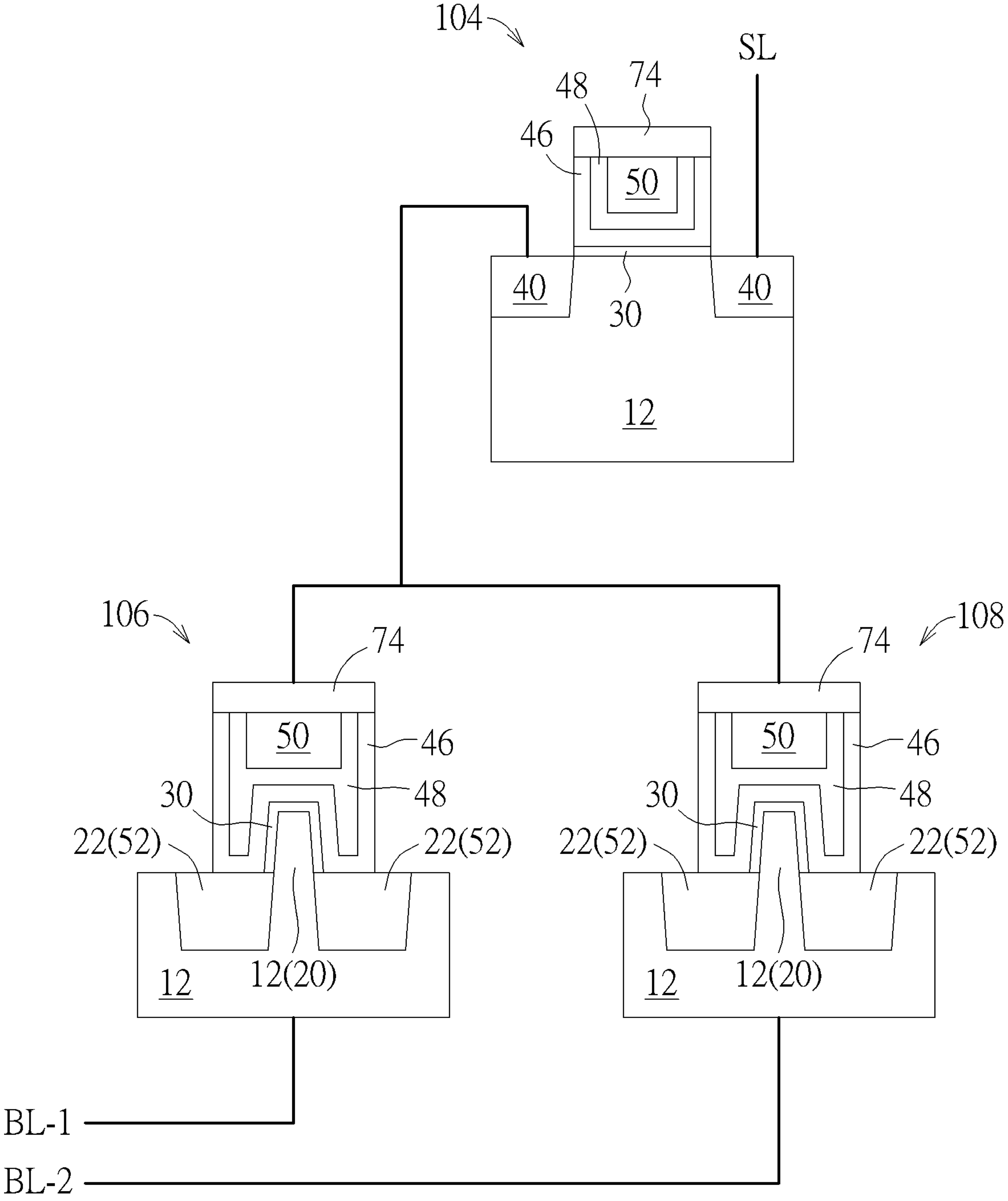
FIG. 2 illustrates a structural view of the PUF device under semiconductor architecture according to an embodiment of the present invention.

Referring to FIGS. 2-8, FIG. 2 illustrates a structural view of the PUF device under semiconductor architecture according to an embodiment of the present invention and FIGS. 3-8 illustrate a method for fabricating MOS transistor and MOSCAP of the PUF device according to an embodiment of the present invention. As shown in FIG. 2, the PUF device includes a transistor 104 such as a MOS transistor and a first MOSCAP 106 and a second MOSCAP 108 coupled to the transistor 104 at the same time, in which the first terminal 112 of the transistor 104 is coupled to the first MOSCAP 106 and the second MOSCAP 108 at the same time, the second terminal 114 is coupled to a source line SL, the first MOSCAP 106 is coupled to the first bit line BL-1, and the second MOSCAP 108 is coupled to the second bit line BL-2.

Figure 3:
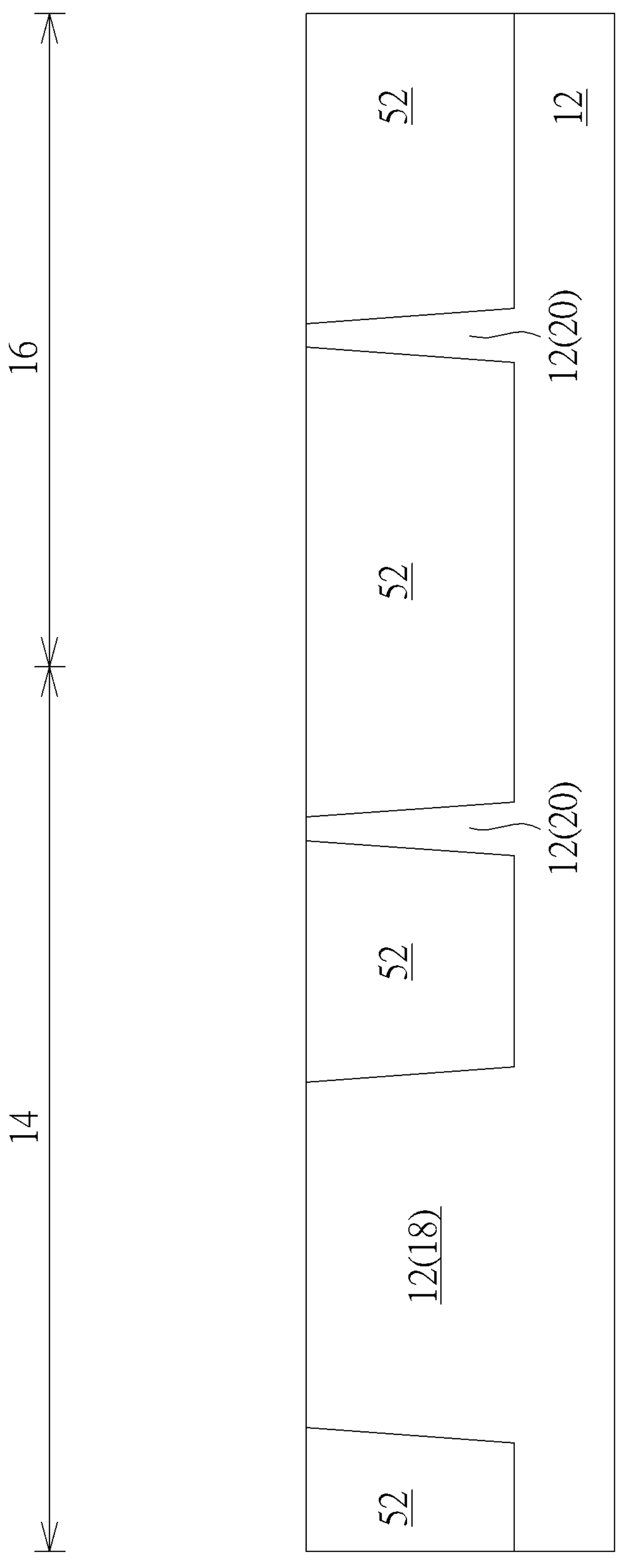
FIGS. 3-8 illustrate a method for fabricating MOS transistor and MOSCAP of the PUF device according to an embodiment of the present invention.

As shown in FIG. 3, the fabrication of the MOS transistor and the MOSCAP devices of the PUF device could be accomplished by first providing a substrate 12 such as a silicon substrate or silicon-on-insulator (SOI) substrate and then defining two or more regions including a non-MOSCAP region 14 and a MOSCAP region 16 on the substrate 12, in which the non-MOSCAP region 14 could be used for fabricating input/output (I/O) devices or low-voltage (LV) devices such as MOS transistors in the PUF device while the MOSCAP region 16 could be used for fabricating a MOSCAP device in the later process. It should be noted that to emphasize inner structures within the MOSCAP, only one MOSCAP device such as either one of the first MOSCAP 106 or the second MOSCAP 108 is formed on the MOSCAP region 16 in the later process.

Next, a base 18 and fin-shaped structure 20 are formed on the non-MOSCAP region 14 and a plurality of fin-shaped structures 20 are formed on the substrate 12 of the MOSCAP region 16. Preferably, the fin-shaped structures 20 could be obtained by a sidewall image transfer (SIT) process. For instance, a layout pattern is first input into a computer system and is modified through suitable calculation. The modified layout is then defined in a mask and further transferred to a layer of sacrificial layer on a substrate through a photolithographic and an etching process. In this way, several sacrificial layers distributed with a same spacing and of a same width are formed on a substrate. Each of the sacrificial layers may be stripe-shaped. Subsequently, a deposition process and an etching process are carried out such that spacers are formed on the sidewalls of the patterned sacrificial layers. In a next step, sacrificial layers can be removed completely by performing an etching process. Through the etching process, the pattern defined by the spacers can be transferred into the substrate underneath, and through additional fin cut processes, desirable pattern structures, such as stripe patterned fin-shaped structures could be obtained.

Alternatively, the base 18 and the fin-shaped structures 20 could also be obtained by first forming a patterned mask (not shown) on the substrate, 12, and through an etching process, the pattern of the patterned mask is transferred to the substrate 12 to form the base 18 and the fin-shaped structures 20. Moreover, the formation of the base 18 and the fin-shaped structures 20 could also be accomplished by first forming a patterned hard mask (not shown) on the substrate 12, and a semiconductor layer composed of silicon germanium is grown from the substrate 12 through exposed patterned hard mask via selective epitaxial growth process to form the corresponding the base 18 and fin-shaped structures 20. These approaches for forming the base 18 and fin-shaped structures 20 are all within the scope of the present invention.

Next, a flowable chemical vapor deposition (FCVD) process is conducted to form an insulating layer 52 made of silicon oxide on the base 18 and the fin-shaped structures 20 and filling the trenches between the base 18 and the fin-shaped structures 20, and a planarizing process such as chemical mechanical polishing (CMP) process is conducted to remove part of the insulating layer 52 so that the top surface of the remaining insulating layer 52 is even with the top surface of the fin-shaped structures 20.

Figure 4:
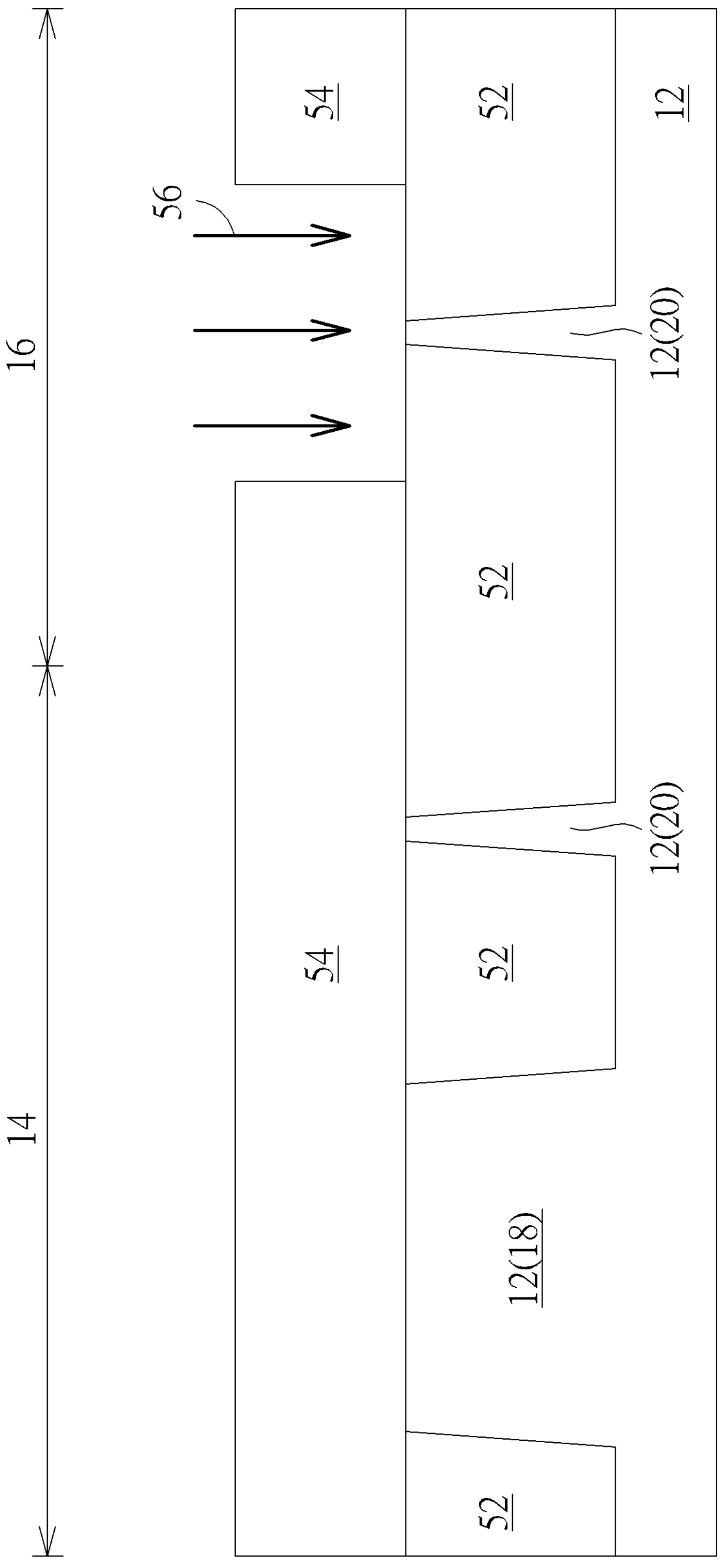

Next, as shown in FIG. 4, a patterned mask 54 such as patterned resist is formed on the non-MOSCAP region 14 and even part of the MOSCAP region 16 to expose part of the insulating layer 52 and fin-shaped structures 20 on the MOSCAP region 16, and then an ion implantation process 56 is conducted to implant dopants such as arsenic (As) and phosphorus (P) into the fin-shaped structures 20.

Since the ion implantation process 56 conducted at this stage only implant ions into the fin-shaped structures 20 on the MOSCAP region 16 but not the ones on the non-MOSCAP region 14, the overall dopant concentration of the fin-shaped structures 20 on the MOSCAP region 16 is preferably greater than the overall dopant concentration of the fin-shaped structures 20 on the non-MOSCAP region 14 as the fin-shaped structures 20 doped with heavy ions on the MOSCAP region 16 could be used as a bottom electrode for the MOSCAP device in the later process.

Figure 5:
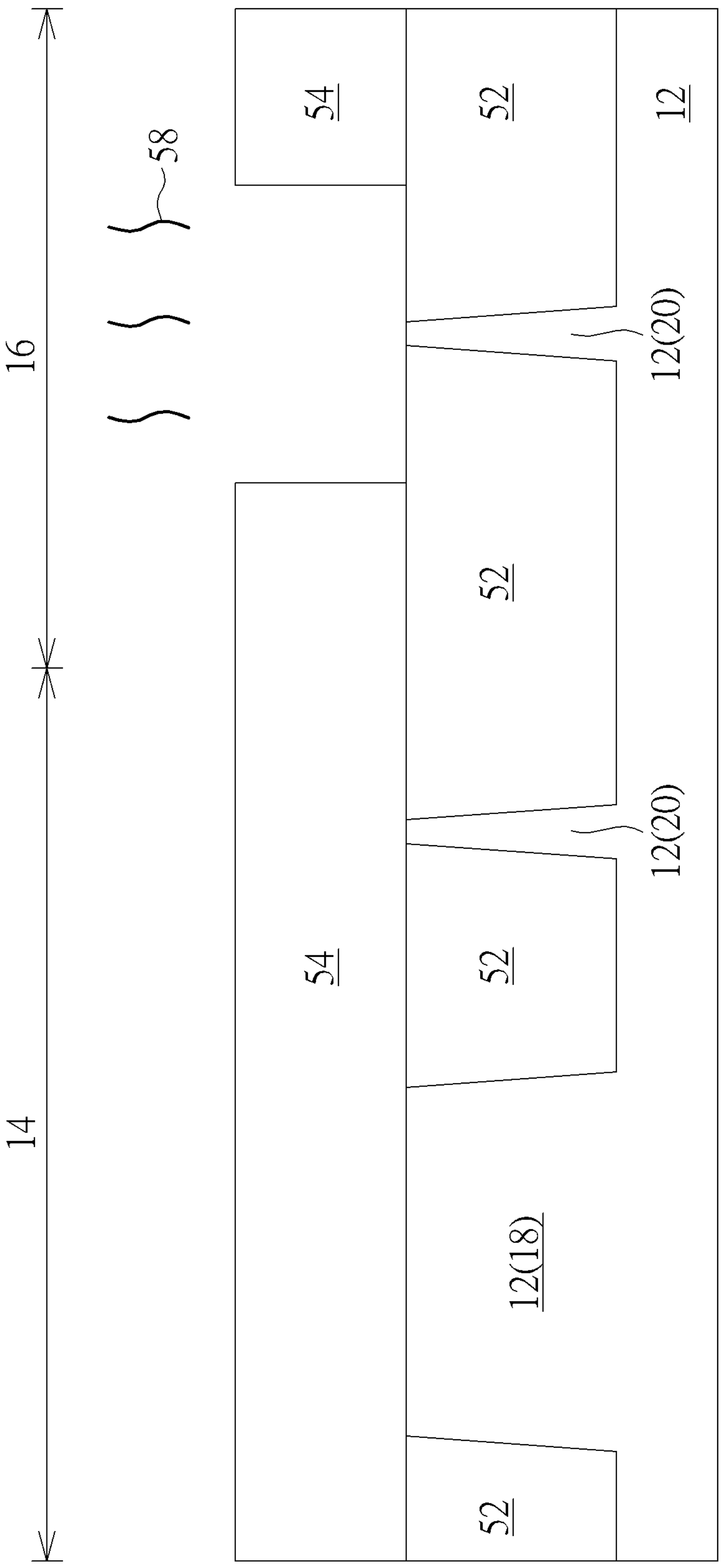

Next, as shown in FIG. 5, a thermal treatment process or more specifically a spike anneal process 58 is conducted by using high temperature to diffuse the aforementioned dopants into surrounding fin-shaped structures 20. Preferably, the temperature of the spike anneal process 58 is between 950-1250° C. and the duration of the spike anneal process 58 is between 0-3 seconds. The patterned mask 54 is then removed thereafter. It should be noted that even though this embodiment first conducts the spike anneal process 58 and then remove the patterned mask 54 thereafter, according to other embodiment of the present invention, it would also be desirable to strip the patterned mask 54 completely and then conduct the spike anneal process 58, which is also within the scope of the present invention.

Figure 6:
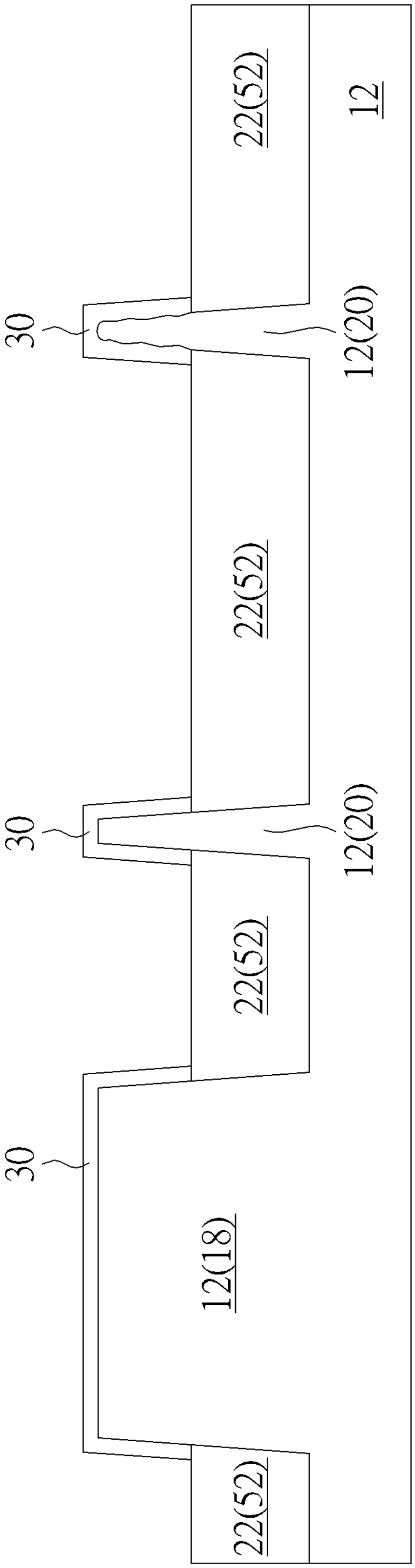

Next, as shown in FIG. 6, an etching process could be conducted to remove part of the insulating layer 52 on the non-MOSCAP region 14 and the MOSCAP region 16 so that the top surface of the remaining insulating layer 52 is slightly lower than the top surface of the fin-shaped structures 20 to form a shallow trench isolation (STI) 22. Next, an oxide growth process such as a rapid thermal oxidation (RTO) process or an in-situ steam generation (ISSG) is conducted to form a gate oxide layer 30 made of silicon oxide on the substrate 12 and fin-shaped structures 20 on the non-MOSCAP region 14 and MOSCAP region 16. It should be noted that since the fin-shaped structures 20 on the MOSCAP region 16 were treated in the previously, sidewalls of the fin-shaped structures 20 are likely to reveal uneven such as wavy or rough surface as etching process is conducted to protrude the fin-shaped structures 20 above the STI 22 surface on the MOSCAP region 16. Conversely, sidewalls of the fin-shaped structures 20 on the non-MOSCAP region 14 at this stage still remain planar.

Figure 7:
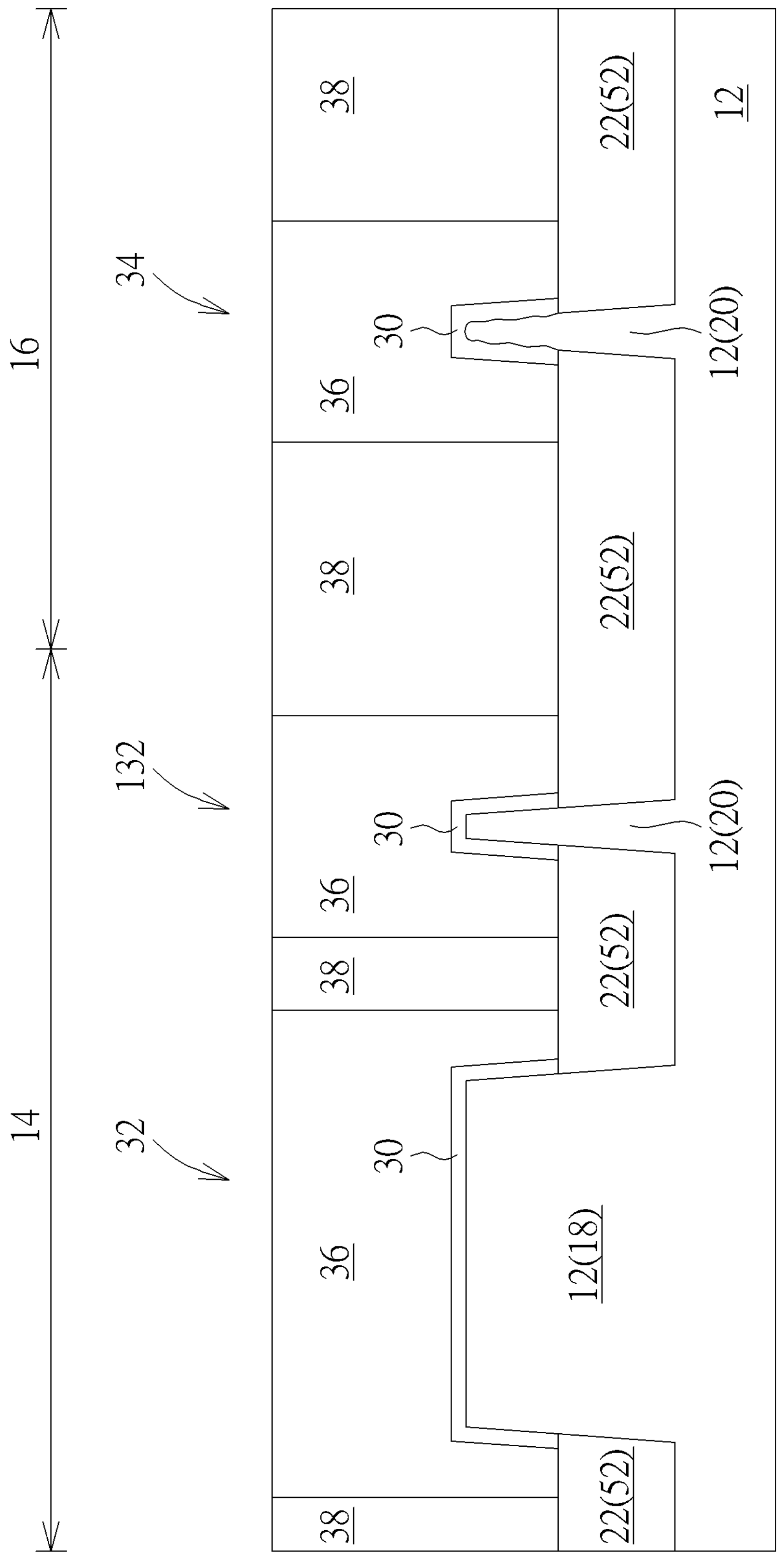

Next, as shown in FIG. 7, gate electrodes 32, 34, 132 are formed on the substrate 12 and fin-shaped structures 20 on the non-MOSCAP region 14 and MOSCAP region 16 respectively, in which the gate electrode 32 formed on the non-MOSCAP region 14 could be served as gate electrode for MV device, the gate electrode 132 formed on the non-MOSCAP region 14 could be served as gate electrode for transistor 104 in the PUF device, the gate electrode 34 formed on the MOSCAP region 16 could be used as top electrode for the MOSCAP device, and formation of the gate electrodes 32, 34, 132 could be accomplished by a gate first process, a high-k first approach from gate last process, or a high-k last approach from gate last process.

Since this embodiment pertains to a high-k last approach, a gate material layer 36 made of polysilicon and a selective hard mask (not shown) could be formed sequentially on the substrate 12, and a photo-etching process is then conducted by using a patterned resist (not shown) as mask to remove part of the gate material layer 36 and part of the gate oxide layer 30 through single or multiple etching processes. After stripping the patterned resist, gate electrodes 32, 34, 132 each made of a patterned material layer 36 is formed on the substrate 12 and fin-shaped structures 20 of the non-MOSCAP region 14 and MOSCAP region 16.

Next, at least a spacer (not shown) is formed on the sidewalls of the each of the gate electrodes 32, 34, 132, a source/drain region 40 and/or epitaxial layer is formed in the fin-shaped structures 20 and/or substrate 12 adjacent to two sides of the spacer on the non-MOSCAP region 14, and selective silicide layers (not shown) could be formed on the surface of the source/drain region. In this embodiment, the spacer could be a single spacer or a composite spacer, such as a spacer including but not limited to for example an offset spacer and a main spacer. Preferably, the offset spacer and the main spacer could include same material or different material while both the offset spacer and the main spacer could be made of material including but not limited to for example $SiO_2$, SiN, SiON, SiCN, or combination thereof. The source/drain region 40 could include n-type dopants or p-type dopants depending on the type of device being fabricated.

Next, an interlayer dielectric (ILD) layer 38 is formed on the gate electrodes 32, 34, 132 and a planarizing process such as CMP is conducted to remove part of the ILD layer 38 for exposing the gate material layers 36 or gate electrodes 32, 34, 132 made of polysilicon so that the top surface of the gate electrodes 32, 34, 132 are even with the top surface of the ILD layer 38.

Figure 8:
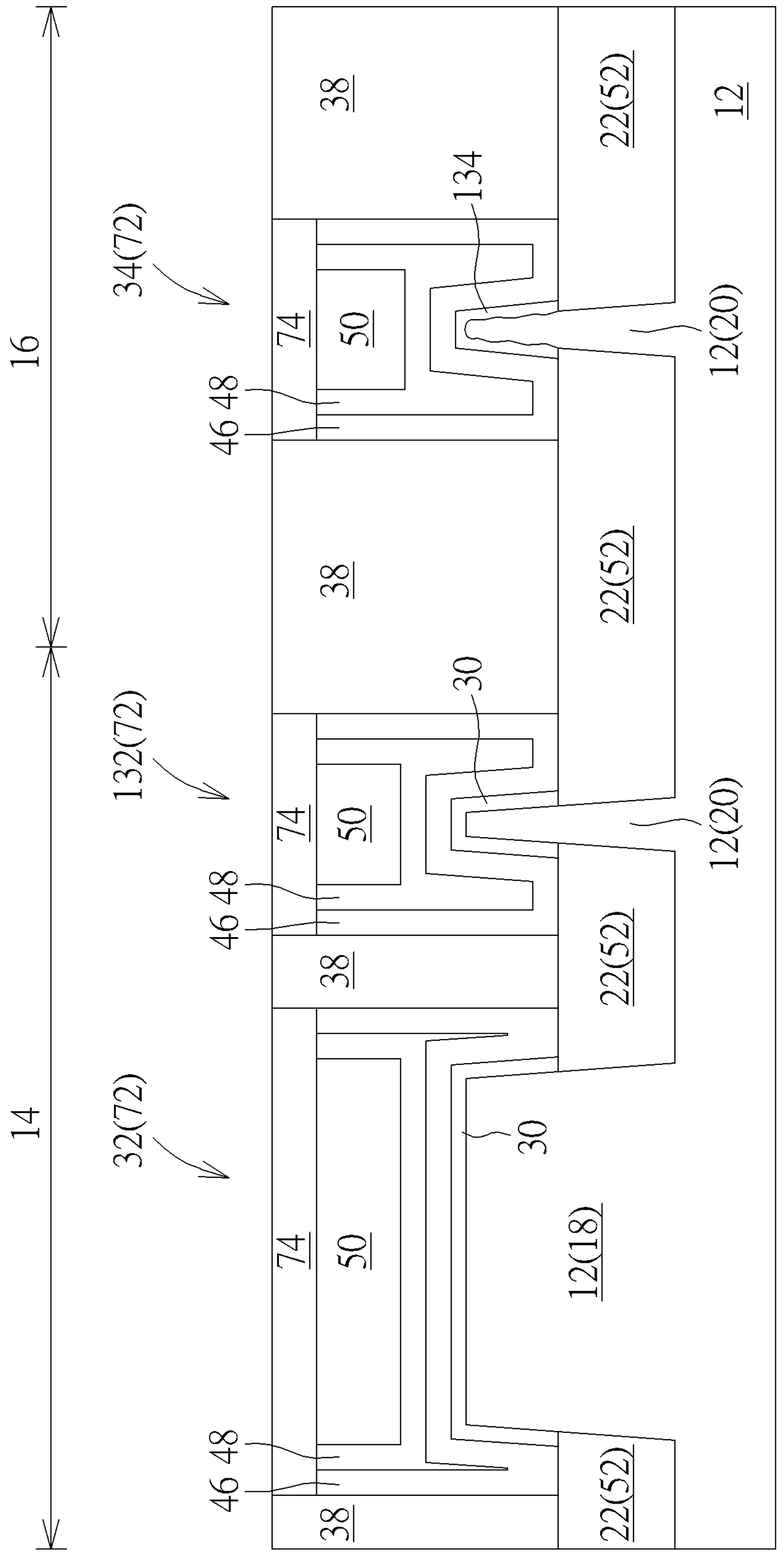

Next, as shown in FIG. 8, a replacement metal gate (RMG) process is conducted to transform the gate electrodes 32, 34, 132 on the non-MOSCAP region 14 and MOSCAP region 16 into metal gates. For instance, the RMG process could be accomplished by first performing a selective dry etching or wet etching process using etchants including but not limited to for example ammonium hydroxide ($NH_4OH$) or tetramethylammonium hydroxide (TMAH) to remove the gate material layer 36 and even gate oxide layer 30 for forming recesses (not shown) in the ILD layer 38.

Next, a selective patterned mask (not shown) such as patterned resist is formed on the non-MOSCAP region 14, and an etching process is conducted by using the patterned mask as mask to remove the gate oxide layer 30 on the MOSCAP region 16 for exposing the surface of the fin-shaped structure 20. Next, an interfacial layer 134 made of silicon oxide is formed on the surface of the fin-shaped structure 20 on the MOSCAP region 16, the patterned mask is removed, a high-k dielectric layer 46, a work function metal layer 48, and a low resistance metal layer 50 are formed in the recesses, and a planarizing process such as CMP is conducted to remove part of low resistance metal layer 50, part of work function metal layer 48, and part of high-k dielectric layer 46 to form metal gates 72. In this embodiment, the gate structures or metal gates 72 fabricated through high-k last process of a gate last process preferably includes an interfacial layer 134 or gate oxide layer 30, a U-shaped high-k dielectric layer 46, a U-shaped work function metal layer 48, and a low resistance metal layer 50. It should be noted that even though the gate oxide layer 30 and interfacial layer 134 formed on the non-MOSCAP region 14 and MOSCAP region 16 are both made of silicon oxide, the thickness of the interfacial layer 134 is preferably less than the thickness of the gate oxide layer 30 or more specifically the thickness of the interfacial layer 134 is less than half the thickness of the gate oxide layer 30.

In this embodiment, the high-k dielectric layer 46 is preferably selected from dielectric materials having dielectric constant (k value) larger than 4. For instance, the high-k dielectric layer 50 may be selected from hafnium oxide ($HfO_2$), hafnium silicon oxide ($HfSiO_4$), hafnium silicon oxynitride (HfSiON), aluminum oxide ($Al_2O_3$), lanthanum oxide ($La_2O_3$), tantalum oxide ($Ta_2O_5$), yttrium oxide ($Y_2O_3$), zirconium oxide ($ZrO_2$), strontium titanate oxide ($SrTiO_3$), zirconium silicon oxide ($ZrSiO_4$), hafnium zirconium oxide ($HfZrO_4$), strontium bismuth tantalate ($SrBi_2Ta_2O_9$, SBT), lead zirconate titanate ($PbZr_xTi_{1-x}O_3$, PZT), barium strontium titanate ($Ba_xSr_{1-x}TiO_3$, BST) or a combination thereof.

In this embodiment, the work function metal layer 48 is formed for tuning the work function of the metal gate in accordance with the conductivity of the device. For an NMOS transistor, the work function metal layer 48 having a work function ranging between 3.9 eV and 4.3 eV may include titanium aluminide (TiAl), zirconium aluminide (ZrAl), tungsten aluminide (WAl), tantalum aluminide (TaAl), hafnium aluminide (HfAl), or titanium aluminum carbide (TiAlC), but it is not limited thereto. For a PMOS transistor, the work function metal layer 48 having a work function ranging between 4.8 eV and 5.2 eV may include titanium nitride (TiN), tantalum nitride (TaN), tantalum carbide (TaC), but it is not limited thereto. An optional barrier layer (not shown) could be formed between the work function metal layer 48 and the low resistance metal layer 50, in which the material of the barrier layer may include titanium (Ti), titanium nitride (TiN), tantalum (Ta) or tantalum nitride (TaN). Furthermore, the material of the low-resistance metal layer 50 may include copper (Cu), aluminum (Al), titanium aluminum (TiAl), cobalt tungsten phosphide (CoWP) or any combination thereof.

Next, part of the high-k dielectric layer 46, part of the work function metal layer 48, and part of the low resistance metal layer 50 are removed to form recesses (not shown), and a hard mask 74 is formed into each of the recesses so that the top surfaces of the hard masks 74 and the ILD layer 38 are coplanar. Preferably the hard masks 74 could include $SiO_2$, SiN, SiON, SiCN, or combination thereof.

Next, a photo-etching process is conducted by using a patterned mask (not shown) as mask to remove part of the ILD layer 38 adjacent to the gate electrodes 32, 132 on the non-MOSCAP region 14 for forming contact holes (not shown) exposing the source/drain region underneath. Next, conductive materials including a barrier layer selected from the group consisting of titanium (Ti), titanium nitride (TiN), tantalum (Ta), and tantalum nitride (TaN) and a metal layer selected from the group consisting of tungsten (W), copper (Cu), aluminum (Al), titanium aluminide (TiAl), and cobalt tungsten phosphide (CoWP) are deposited into the contact holes, and a planarizing process such as CMP is conducted to remove part of aforementioned barrier layer and low resistance metal layer for forming contact plugs electrically connecting the source/drain region 40. This completes the fabrication of MOS transistors and MOSCAP of the PUF device shown in FIG. 2 according to an embodiment of the present invention.

As shown in FIG. 8, the PUF device includes at least a transistor 114 such as a MOS transistor having gate electrode 132 disposed on the non-MOSCAP region 14 and at least a MOSCAP device disposed on the MOSCAP region 16. In this embodiment, the MOSCAP device includes a plurality of fin-shaped structures 20 disposed on the substrate 12, at least an insulating layer such as a combination of the interfacial layer 134 and/or high-k dielectric layer 46 on the fin-shaped structures 20, and a gate electrode 34 disposed on the interfacial layer 134. Preferably, the heavily doped fin-shaped structures 20 are served as a bottom electrode for the MOSCAP device, dielectric material including the interfacial layer 134 and/or high-k dielectric layer 46 is served as a capacitor dielectric layer for the MOSCAP device, and the gate electrode 34 including the work function metal layer 48 and low resistance metal layer 50 together is served as a top electrode for the MOSCAP device. Even though the fin-shaped structures 20 on the non-MOSCAP region 14 and the MOSCAP region 16 are fabricated from the same process, the overall or maximum concentration of the fin-shaped structures 20 on the non-MOSCAP region 14 is slightly less than the overall or maximum concentration of the fin-shaped structure 20 on the MOSCAP region 16.

Overall, the present invention discloses a method for fabricating PUF device, which first provides a PUF cell array having a plurality of unit cells and each of the unit cells further includes a transistor and a first MOSCAP and a second MOSCAP coupled to the transistor. Next, a voltage is transmitted through the transistor to the first MOSCAP and the second MOSCAP to determine whether the first MOSCAP or the second MOSCAP reaches a breakdown.

According to a preferred embodiment of the present invention, the action of using electrical voltage to stress the first MOSCAP 106 and the second MOSCAP 108 until one of the two MOSCAPs 106, 108 reaches a breakdown is completely random and as one of the MOSCAP devices reaches breakdown, a first state value is assigned to one of the MOSCAP while a second state value is assigned to the other one of the MOSCAP. For instance, if the first bit line BL-1 detects that the first MOSCAP 106 is under breakdown, a first state value such as state 1 could be assigned to the first MOSCAP 106 whereas if the second bit line BL-2 detects the second MOSCAP 108 is under breakdown, a second state value such as state 0 could be assigned to the second MOSCAP 108. Preferably, the randomly switching of different states between the two MOSCAPs could particularly be used as a unique or unclonable feature for a PUF device or chip.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for fabricating a physically unclonable function (PUF) device, comprising:

providing a PUF cell array comprising a plurality of unit cells, wherein each of the unit cells comprises;

a transistor; and a first metal-oxide semiconductor capacitor (MOSCAP) and a second MOSCAP coupled to the transistor, wherein the first MOSCAP is coupled to a first bit line and the second MOSCAP is coupled to a second bit line; and transmitting a voltage from a source line coupled to the transistor through the transistor to the first MOSCAP and the second MOSCAP and determining whether the first MOSCAP or the second MOSCAP reaches a breakdown.

2. The method of claim 1, further comprising: transmitting the voltage to the first MOSCAP for initiating a breakdown, wherein the first MOSCAP is assigned a first state and the second MOSCAP is assigned a second state.

3. The method of claim 1, further comprising: transmitting the voltage to the second MOSCAP for initiating a breakdown, wherein the second MOSCAP is assigned a first state and the first MOSCAP is assigned a second state.

4. The method of claim 1, wherein the transistor comprises: a gate; a first terminal; and a second terminal.

5. The method of claim 4, wherein the gate is coupled to a word line.

6. The method of claim 4, wherein the first terminal is coupled to the first MOSCAP and the second MOSCAP.

7. The method of claim 4, wherein the second terminal is coupled to a source line.

8. A physically unclonable function (PUF) device, comprising:

a PUF cell array comprising a plurality of unit cells, wherein each of the unit cells comprises:

a transistor; and a first metal-oxide semiconductor capacitor (MOSCAP) and a second MOSCAP coupled to the transistor, wherein the first MOSCAP is coupled to a first bit line and the second MOSCAP is coupled to a second bit line, wherein a voltage is transmitted from a source line coupled to the transistor through the transistor to the first MOSCAP and the second MOSCAP to determine whether the first MOSCAP or the second MOSCAP reaches a breakdown.

9. The PUF device of claim 8, wherein the first MOSCAP is assigned a first state and the second MOSCAP is assigned a second state when the voltage is transmitted to the first MOSCAP for initiating a breakdown.

10. The PUF device of claim 8, wherein the second MOSCAP is assigned a first state and the first MOSCAP is assigned a second state when the voltage is transmitted to the second MOSCAP for initiating a breakdown.

11. The PUF device of claim 8, wherein the transistor comprises: a gate; a first terminal; and a second terminal.

12. The PUF device of claim 11, wherein the gate is coupled to a word line.

13. The PUF device of claim 11, wherein the first terminal is coupled to the first MOSCAP and the second MOSCAP.

14. The PUF device of claim 11, wherein the second terminal is coupled to a source line.

* * * * *